(12) United States Patent
Jang et al.

(10) Patent No.: US 12,185,887 B2
(45) Date of Patent: Jan. 7, 2025

(54) AI ROBOT CLEANER AND ROBOT SYSTEM HAVING THE SAME

(71) Applicant: LG ELECTRONICS INC., Seoul (KR)

(72) Inventors: Jaewon Jang, Seoul (KR); Yeongjae Lee, Seoul (KR); Youngbin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 280 days.

(21) Appl. No.: 17/636,106

(22) PCT Filed: Feb. 17, 2020

(86) PCT No.: PCT/KR2020/002200
§ 371 (c)(1),
(2) Date: Feb. 17, 2022

(87) PCT Pub. No.: WO2021/040161
PCT Pub. Date: Mar. 4, 2021

(65) Prior Publication Data
US 2022/0287532 A1 Sep. 15, 2022

(30) Foreign Application Priority Data

Aug. 23, 2019 (KR) .................. 10-2019-0103764
Jan. 3, 2020 (KR) .................. 10-2020-0000785

(51) Int. Cl.
*A47L 11/40* (2006.01)
*A47L 11/282* (2006.01)
*G05D 1/00* (2024.01)

(52) U.S. Cl.
CPC ......... *A47L 11/4011* (2013.01); *A47L 11/282* (2013.01); *A47L 11/4002* (2013.01);
(Continued)

(58) Field of Classification Search
CPC ............... A47L 11/282; A47L 11/4002; A47L 11/4011; A47L 11/4038; A47L 11/4063;
(Continued)

(56) References Cited

U.S. PATENT DOCUMENTS

2017/0049287 A1* 2/2017 Knutson ............... A47L 11/201
2019/0038105 A1* 2/2019 Park ........................ A47L 9/28
2019/0223678 A1* 7/2019 Park ........................ A47L 11/40

FOREIGN PATENT DOCUMENTS

CN          209136466           7/2019
JP          2015-054185         3/2015
(Continued)

OTHER PUBLICATIONS

Machine translation of KR2015-0006525A (Year: 2015).*
(Continued)

*Primary Examiner* — Douglas Lee
(74) *Attorney, Agent, or Firm* — KED & ASSOCIATES, LLP

(57) ABSTRACT

Disclosed is a robot cleaner including: a main body forming an outer shape; a pair of rotary mops moving the main body while rotating in contact with a floor; a drive motor rotating the pair of rotary mops; a pump connected to a water tank and driving a nozzle for spraying water to the rotary mop; and a controller for determining water content of the rotary mop in a preliminary step before wet cleaning, and controlling to start the wet cleaning after driving the pump until the water content of the rotary mop satisfy a certain level. Accordingly, it is possible to detect a change in the output current of the motor of the rotary mop of the robot cleaner and determine the water content according to the change in the current value.

22 Claims, 11 Drawing Sheets

(52) U.S. Cl.
CPC ....... *A47L 11/4038* (2013.01); *A47L 11/4066* (2013.01); *A47L 11/4069* (2013.01); *A47L 11/4088* (2013.01); *A47L 2201/04* (2013.01); *A47L 2201/06* (2013.01); *G05D 1/021* (2013.01)

(58) Field of Classification Search
CPC ............. A47L 11/4066; A47L 11/4069; A47L 11/4088; A47L 2201/022; A47L 2201/04; A47L 2201/06; A47L 11/408; B25J 11/0085; B25J 19/02; B25J 9/1674; G05D 1/021

See application file for complete search history.

(56) References Cited

FOREIGN PATENT DOCUMENTS

| | | | | |
|---|---|---|---|---|
| KR | 10-2004-0052094 | | 6/2004 | |
| KR | 200435130 Y1 | * | 1/2007 | |
| KR | 10-2014-0146702 | | 12/2014 | |
| KR | 10-2015-0006525 | | 1/2015 | |
| KR | 20150006525 A | * | 1/2015 | |
| KR | 10-2019-0015930 | | 2/2019 | |
| KR | 10-2019-0081047 | | 7/2019 | |
| KR | 20-2019-0001672 | | 7/2019 | |
| WO | WO-2018012923 A1 | * | 1/2018 | .............. A47L 11/14 |
| WO | WO 2019/147042 | | 8/2019 | |

OTHER PUBLICATIONS

Machine translation of KR200435130Y1 (Year: 2007).*
International Search Report dated Jun. 12, 2020 issued in Application No. PCT/KR2020/002200.
European Search Report dated Mar. 5, 2024 issued in Application No. 20858330.2.

* cited by examiner

AI ROBOT CLEANER AND ROBOT SYSTEM HAVING THE SAME

CROSS-REFERENCE TO RELATED PATENT APPLICATIONS

This application is a U.S. National Stage Application under 35 U.S.C. § 371 of PCT Application No. PCT/KR2020/002200, filed Feb. 17, 2020, which claims priority to Korean Patent Application Nos. 10-2019-0103764, filed Aug. 23, 2019 and 10-2020-0000785, filed Jan. 3, 2020, whose entire disclosures are hereby incorporated by reference.

TECHNICAL FIELD

Background Art

Recently, the use of robots in the home is gradually increasing. A representative example of such a home robot is a cleaning robot. The cleaning robot is a moving robot that travels on a certain zone by itself, and sucks foreign matter such as dust accumulated on the floor to clean a cleaning space automatically, or can be moved by using a rotary mop and perform cleaning by using the rotary mop to wipe the floor. In addition, is also possible to mop the floor by supplying water to the rotary mop.

However, if the water supplied to the rotary mop is not properly adjusted, there is a problem in that the floor cannot be cleaned appropriately, as if excessive water is remained on the floor to be cleaned or the floor is wiped with a dry mop.

In the case of Korean Publication Patent No. 1020040052094, a cleaning robot capable of performing water cleaning, while including a mop roller having a mop cloth on its outer circumferential surface to wipe off the steam sprayed on the floor with dust, is disclosed. Such a cleaning robot sprays steam on the surface of the cleaning floor for wet cleaning, and has a cloth for mop to wipe off the sprayed steam and dust. In addition, Korean Publication Patent No. 20140146702 discloses a robot cleaner for determining whether water can be accommodated inside a robot cleaner capable of performing wet cleaning, and a control method thereof.

Meanwhile, in relation to the technology for detecting the water content of the rotary mop of a mop cleaner, Korean Patent Publication No. 1020190015930 discloses that a reference motion is set, the slip rate is measured based on the actual speed of a corresponding reference motion and the expected ideal speed, and according to the measured slip rate, the water content is calculated.

However, according to such a related art, floor information, which is the fundamental element for the calculation, must be obtained through various sensors to set parameters, and the movement may be performed while a reference motion is performed without securing information on the water content.

Due to the movement of such a reference motion, the operation of the mop cleaner may proceed in a state in which the water content is not secured so that the cleaning efficiency is significantly reduced, and uniformity is lowered because re-cleaning of a corresponding zone is not performed.

In particular, the conventional mop cleaner can perform cleaning only by random traveling and it is not possible to accomplish a pattern traveling that can perform meticulous cleaning. Therefore, in the case of only random traveling, it is difficult to meticulously clean a corner of floor surface or an area adjacent to a wall.

PRIOR ART DOCUMENT

Patent Document

Korean Patent Publication No. 1020040052094 (published. Jun. 19, 2004)
Korean Patent Publication No. 20140146702 (published Dec. 29, 2014)
Korean Patent Publication No. 1020190015930 (published Feb. 15, 2019)

DISCLOSURE

Technical Problem

As described above, in the driving of the robot cleaner equipped with a mop, when cleaning is started without securing the initial water content, the efficiency and uniformity of cleaning may be significantly reduced.

A first object of the present disclosure is to provide a method for controlling the water content of a robot cleaner that, when cleaning is started, can measure the water content of the mop and thus reinforce the water content to start the cleaning, so that the overall cleaning uniformity can be satisfied, and can accomplish a pattern traveling for achieving a smooth direction change by securing sufficient water content and traveling.

That is, the first object of the present disclosure is to provide a control method of a robot cleaner that can start a main cleaning after measuring and reinforcing the water content without an arbitrary traveling by measuring the water content before performing an operation for cleaning, that is, a rotation operation.

In addition, in order to omit the process of obtaining the parameters for calculating the water content required in the related art, a second object of the present disclosure is to provide a robot cleaner which has a water content sensor and can simply measure the water content of the mop without requiring other sensor.

At this time, another object of the present disclosure is to provide a control method of a robot cleaner which can detect the change in the output current of a motor of rotary mop of the robot cleaner without a separate moisture sensor and determine the water content according to the change in the current value.

The present disclosure is not limited to the above-mentioned problems, and other objects not mentioned will be clearly understood by those skilled in the art from the following description.

Technical Solution

According to an embodiment of the present disclosure, provided is a method of controlling the water content of the robot cleaner that can measure the water content of the mop cloth when cleaning is started and accordingly reinforce the water content to start cleaning, thereby satisfying the overall cleaning uniformity.

The present disclosure includes a preliminary step before the main wet cleaning, of proceeding with the wet cleaning when the water content is satisfied after determining the water content of the rotary mop in the preliminary step.

Specifically, the present disclosure provides a robot cleaner including: a main body forming an outer shape; a pair of rotary mops moving the main body while rotating in contact with a floor; a drive motor rotating the pair of rotary mops; a pump connected to a water tank and driving a nozzle for spraying water to the rotary mop; and a controller for, after receiving a cleaning start signal, determining water content of the rotary mop in a preliminary step before wet cleaning, and controlling to start the wet cleaning after driving the pump until the water content of the rotary mop satisfy a certain level.

The preliminary step may be performed before the wet cleaning after receiving a cleaning start signal of spraying water until the water content satisfies a certain level while the robot cleaner moves forward or is operated in a certain pattern mode.

The controller reads an output current of the drive motor and determines the water content of the rotary mop.

The controller reads the output current of the drive motor, and controls the wet cleaning when the output current is greater than a threshold value.

The threshold value corresponds to a minimum value of wet-cleanable water content.

The robot cleaner further comprises a water content sensor that measures the water content of the rotary mop, and outputs a detection signal to the controller.

The water content sensor is formed to be adjacent to the rotary mop.

The water content sensor is disposed between the two pairs of rotary mop.

The water content sensor is a humidity sensor or a conductivity sensor.

The controller receives the detection signal from the water content sensor in the preliminary step, and controls to start the wet cleaning, when the water content corresponding to the detection signal is greater than a threshold value.

The robot cleaner further includes a communication unit that transmits detection information related to the water content, wherein, through the communication unit, the detection information related to the water content is transmitted to a user terminal and a control command is received from the user terminal.

The robot cleaner transmits to display the detection information for the water content through an application for controlling the robot cleaner installed in the user terminal.

The robot cleaner receives a command to increase the water content or stop cleaning from the user terminal in the preliminary step, and operates according to the command.

Meanwhile, the present disclosure provides a method of controlling a robot cleaner comprising a pair of rotary mops for performing wet cleaning of a floor while rotating in contact with the floor. The method includes: receiving a cleaning start command of the robot cleaner; detecting water content of the rotary mop and adjusting the water content of the rotary mop so that the water content of the rotary mop satisfies a certain level, as a preliminary step; and a wet cleaning step of performing the wet cleaning by rotating the rotary mop while spraying water to the rotary mop, when the water content of the rotary mop satisfies the certain level or higher.

The robot cleaner includes: a drive motor for rotating the pair of rotating mops, and a pump that is connected to a water tank and drives a nozzle that sprays water to the rotary mop.

The preliminary step includes, when an output current of the drive motor is read and the output current is greater than a threshold value, controlling to proceed with the wet cleaning.

The threshold value corresponds to a minimum value of wet-cleanable water content.

The preliminary step includes separating the robot cleaner from a charging base, and reading the output current of the drive motor while moving the robot cleaner in a preset direction.

The robot cleaner further includes a water content sensor for measuring the water content of the rotary mop and outputting a detection signal to the controller.

The water content sensor is disposed between the two pairs of rotary mops.

The preliminary step includes receiving the detection signal from the water content sensor, and starting the wet cleaning when the water content corresponding to the detection signal is greater than a threshold value.

The preliminary step includes performing water spray so that the water content of the rotary mop satisfies the certain level while the robot cleaner is stopped.

The preliminary step includes spraying water until the water content satisfies the certain level while the robot cleaner moves forward or operates in a certain pattern mode.

Advantageous Effects

According to a robot cleaner of the present disclosure, there are one or more of the following effects.

The present disclosure provides a robot cleaner which has a simple water content sensor that enables to measure the water content of the rotary mop of the robot cleaner, so that it is effective in cost and space utilization.

In addition, it is possible to detect the change in the output current of the motor of the rotary mop of the robot cleaner and determine the water content according to the change in the current value.

Therefore, the direction change is smoothly performed by performing the traveling after containing sufficient water content, which is advantageous in the pattern driving.

Effects of the present disclosure are not limited to the above-mentioned effects, and other effects not mentioned will be clearly understood by those skilled in the art from the description of the claims.

MODE FOR INVENTION

Figure 1:
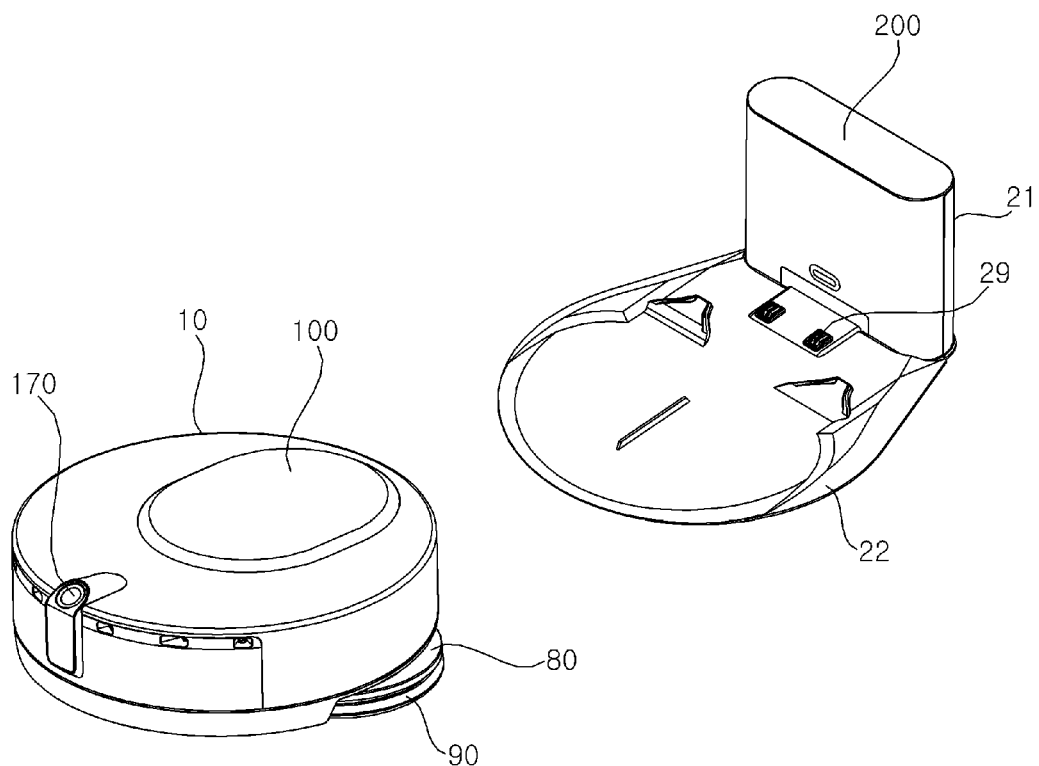
FIG. 1 is a perspective view of a robot cleaner according to an embodiment of the present disclosure.

The expressions used in the following directions, such as "front(F)/rear(R)/left(Le)/right(Ri)/up(U)/down(D)", are defined as indicated in the drawings, but this is for the purpose of describing the present disclosure so that the present disclosure can be clearly understood, and it is obvious that directions can be defined differently according to where the reference is placed.

For example, a direction parallel to a virtual line connecting a central axis of a left rotary mop and a central axis of a right rotary mop is defined as a left and right direction, a direction which is perpendicularly intersects with the left and right direction, parallel to the central axis of the rotary mops, or has an error angle within 5 degrees or less is defined as an up and down direction, and a direction which is perpendicularly intersects the left and right direction and the up and down direction is defined as a front rear direction. Obviously, the front may mean a main traveling direction of the robot cleaner or a main traveling direction of a pattern traveling of the robot cleaner. Here, the main progress direction may mean a vector sum value of directions progressing within a certain time.

The use of the terms 'first, second', etc. in front of constituent element mentioned below is only to avoid confusion of a referred constituent element, and is not related to the order, importance or master-servant relationship between the constituent elements. For example, an invention including only a second constituent element without a first constituent element can be implemented.

In the drawings, the thickness or size of each constituent element is exaggerated, omitted, or schematically illustrated for convenience and clarity of description. In addition, the size and area of each constituent element does not entirely reflect the actual size or area.

In addition, the angle and direction mentioned in the process of explaining a structure of the present disclosure are based on what is described in drawing. In the description of the structure in the specification, if the reference point and the positional relationship with respect to the angle are not clearly mentioned, reference is made to related drawings FIG. 1 is a perspective view of a robot cleaner according to an embodiment of the present disclosure, FIG. 2 is a bottom view of the robot cleaner of FIG. 1, and FIG. 3 is another state diagram of the bottom view of the robot cleaner of FIG. 2.

Figure 2:
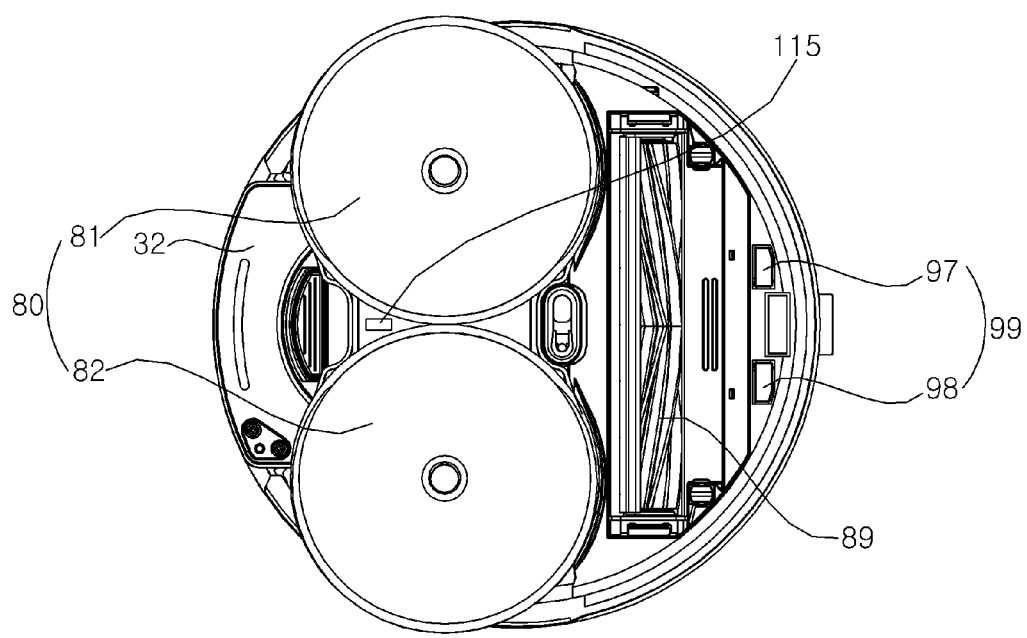
FIG. 2 is a bottom view of the robot cleaner of FIG. 1.
Figure 3:
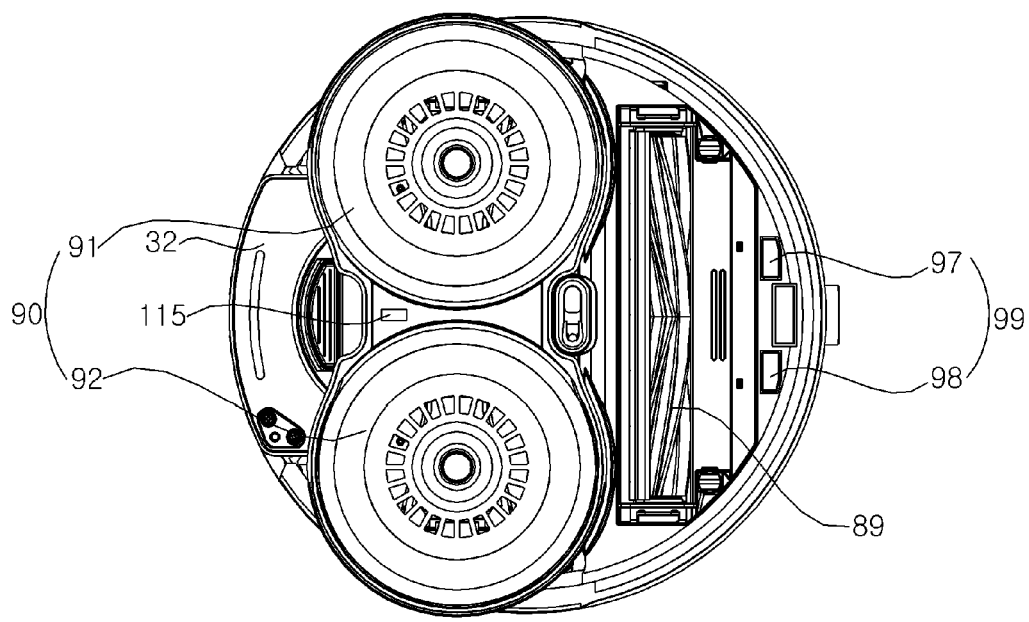
FIG. 3 is another state diagram of the bottom view of the robot cleaner of FIG. 2.

Referring to FIGS. 1 to 3, the robot cleaner 100 according to an embodiment of the present disclosure may provide a service in a prescribed place such as a house. For example, it may be a robot cleaner 100 that provides a cleaning service at a designated place in a home or the like. In particular, the robot cleaner 100 may provide a dry, wet or dry/wet cleaning service according to a function block included.

The robot cleaner 100 may be provided with communication means (not shown) supporting one or more communication standards to communicate with each other. In addition, a plurality of robot cleaners 100 may communicate with a PC, a mobile terminal, and other external server.

For example, the plurality of robot cleaners 100 may be implemented to perform a wireless communication by using a wireless communication technology such as IEEE 802.11 WLAN, IEEE 802.15 WPAN, UWB, Wi-Fi, Zigbee, Z-wave, Blue-Tooth, and the like.

In particular, the robot cleaner 100 may perform a wireless communication with other robot 100 and/or a server 2 through a 5G network. When the robot cleaner 100 performs a wireless communication through the 5G network, real-time response and real-time control can be achieved.

A user can check information related to the robots 100 through a user terminal such as a PC, a mobile terminal.

The robot cleaner 100 may be provided with communication means (not shown) supporting one or more communication standards to communicate with each other.

The robot cleaner 100 may transmit a space, object, and usage-related data to the server 2.

Here, in the data, the space, object-related data may be data related to the recognition of the space and object recognized by the robot cleaner 100, or may be image data for the space and object obtained by the image acquisition unit.

According to an embodiment, the robot cleaner 100 may include artificial neural networks (ANN) in the form of software or hardware learned to recognize at least one of a property of an object such as a user, a voice, a property of a space, an obstacle, and the like.

According to an embodiment of the present disclosure, the robot cleaner 100 may include a deep neural network (DNN) such as convolutional neural network (CNN), recurrent neural network (RNN), deep belief network (DBN), and the like, which have been learned by deep learning. For example, the controller 140 of the robot cleaner 100 may be equipped with a deep neural network (DNN) structure such as a convolutional neural network (CNN).

In addition, the usage-related data may be data obtained according to the use of the robot cleaner 100, and may correspond to usage history data, a detection signal obtained from a sensor unit, and the like.

The learned deep neural network (DNN) structure may receive input data for recognition, recognize attributes of person, object, and space included in the input data, and output the result.

In addition, the learned deep neural network (DNN) structure may receive input data for recognition, analyze and learn the usage-related data of the robot cleaner 100 to recognize the use pattern, the use environment, and the like.

Accordingly, the robot 100 becomes more and more smart, and it is possible to provide an user experience (UX) that evolves as it is used.

The robot cleaner 100 that performs motion due to the rotation of the rotary mop according to the present embodiment moves within an area, and removes foreign matter on the floor surface during traveling.

In addition, the robot cleaner 100 travels on an area by storing charging power supplied from a charging base 200 in a battery (not shown).

The robot cleaner 100 includes a main body 10 for performing a designated operation, an obstacle detecting unit (not shown) disposed in the front surface of the main body 10 to detect obstacle, and an image acquisition unit 170 for photographing a 360-degree image. The main body 10 includes a casing (not shown) forming an outer shape and forming a space in which components constituting the main body 10 are accommodated, a rotary mop 80 provided to be rotatable, a roller 89 assisting the movement and cleaning of the main body 10, and a charging terminal 99 supplied with charging power from the charging base 2.

The rotary mop 80 is disposed in the casing and is formed toward the floor surface so that the mop cloth can be detachable. The rotary mop 80 includes a first rotating plate 81 and a second rotating plate 82 so that the main body 10 moves along the floor of an area through rotation.

The robot cleaner 100 according to the present embodiment may further include a water tank 32 disposed inside the main body 10 to store water, a pump 34 for supplying water stored in the water tank 32 to the rotary mop 80, and a connection hose forming a connection flow path that connects the pump 34 and the water tank 32 or connects the pump 34 and the rotary mop 80.

The robot cleaner 100 according to the present embodiment includes a pair of rotary mops 80, and moves by rotating the pair of rotary mops 80.

The main body 10 travels forward, backward, left, and right as the first and second rotating plates 81 and 82 of the rotary mop 80 rotate around a rotating shaft. In addition, as the first rotating plate and the second rotating plate 81 and 82 rotate, the main body 10 removes foreign matter on the floor surface by the attached mop cloth and performs wet cleaning.

The main body 10 may include a driving unit (not shown) for driving the first rotating plate 81 and the second rotating plate 82. The driving unit may include at least one drive motor 38.

A control panel including an operation unit (not shown) that receives various commands for controlling the robot cleaner 100 from a user may be provided in the upper surface of the main body 10.

In addition, an image acquisition unit 170 is disposed in the front surface or upper surface of the main body 10. The image acquisition unit 170 photographs an image of the indoor area. Based on the image photographed through the image acquisition unit 170, it is possible to detect an obstacle around the main body as well as to monitor the indoor area.

The image acquisition unit 170 is disposed at a certain angle in a front and upper direction to photograph the front and the upper side of the mobile robot. The image acquisition unit 170 may further include a separate camera for photographing the front. The image acquisition unit 170 may be disposed in the upper portion of the main body 10 to face a ceiling, and in some cases, a plurality of cameras may be provided. In addition, the image acquisition unit 170 may be provided with a separate camera for photographing the floor surface.

The robot cleaner 100 may further include a location obtaining means (not shown) for obtaining the current location information. The robot cleaner 100 may include GPS and UWB to determine the current location. In addition, the robot cleaner 100 may determine the current location using an image.

The main body 10 is provided with a rechargeable battery (not shown). The charging terminal 99 of the battery is connected to a commercial power source (e.g. a power outlet in the home), or the main body 10 is docked to the charging base 200 connected to commercial power source. Thus, the charging terminal may be electrically connected to the commercial power source through contact with the terminal 29 of the charging base so that the battery can be charged by a charging power supplied to the main body 10.

The electric components constituting the robot cleaner 100 may be supplied with power from a battery. Thus, the robot cleaner 100 can autonomously travel in a state where the robot cleaner 100 is electrically separated from the commercial power source while the battery is charged.

Hereinafter, the robot cleaner 100 will be described as an example of a mobile robot for wet cleaning, but is not limited thereto, and it should be noted that it is applicable to a robot that autonomously travels on an area and detects sound.

The rotary mop 80 used in the robot cleaner 100 of this embodiment is equipped with a microfiber or fabric type mop pad. Therefore, when rotating the rotary mop 80, a slip occurs so that the robot cleaner 100 cannot move in comparison with the actual rotation of the rotary mop 80. The rotary mop 80 may include a rolling mop driven by a rotation axis parallel to the floor, or a spin mop driven by a rotation axis almost perpendicular to the floor.

The robot cleaner 100 according to the present embodiment may further include a water tank 32 disposed inside the main body 10 and storing water, a pump 34 for supplying the water stored in the water tank 32 to the rotary mop 80, and a connection hose forming a connection flow path that connects the pump 34 and the water tank 32 or connects the pump 34 and the rotary mop 80. The robot cleaner 100 according to the present embodiment may supply the water stored in the water tank 32 to the rotary mop 80 by using a water supply valve (not shown) without a separate pump.

The robot cleaner 100 according to the present embodiment may be disposed in such a manner that the rotary mop 80 is inclined by a certain angle based on the floor surface. To facilitate the movement of the robot cleaner 100, the entire surface of the rotary mop 80 may not be evenly contacted with the floor surface, but may be inclined by a certain angle ($\theta$) to be contacted mainly at a certain portion of the rotary mop 80. In addition, even if it comes into contact with the floor surface on the entire surface of the rotary mop 80, it is also possible to dispose it to generate the most frictional force in a certain portion.

FIG. 3 is a diagram illustrating an embodiment in which a mop cloth is attached to the moving robot of FIG. 1.

As shown in FIG. 3, the rotary mop 80 includes a first rotating plate 81 and a second rotating plate 82.

The first rotating plate 81 and the second rotating plate 82 may be provided with attached mop cloth 90(91, 92), respectively.

The rotary mop 80 is configured such that mop cloth 90(91, 92) can be detachable. The rotary mop 80 may have a mounting member for attachment of the mop cloth 90(91, 92) provided in the first rotating plate 81 and the second rotating plate 82, respectively. For example, the rotary mop 80 may be provided with a velcro, a fitting member, or the like so that the mop cloth 90(91, 92) can be attached and fixed. In addition, the rotary mop 80 may further include a mop cloth frame (not shown) as a separate auxiliary means for fixing the mop cloth 90(91, 92) to the first rotating plate 81 and the second rotating plate 82.

The mop cloth 90 absorbs water to remove foreign matter through friction with the floor surface. The mop cloth 90 is preferably a material such as cotton fabric or cotton blend, but any material containing moisture in a certain ratio or higher and having a certain density can be used, and the material is not limited.

The mop cloth 90 is formed in a circular shape.

The shape of the mop cloth 90 is not limited to the drawing and may be formed in a quadrangle, polygon, or the like. However, considering the rotational motion of the first and second rotating plates 81 and 82, it is preferable that the first and second rotating plates 81 are configured in a shape that does not interfere with the rotation operation of the first and second rotating plates 81 and 82. In addition, the shape of the mop cloth 90 can be changed into a circular shape by the mop cloth frame provided separately.

The rotary mop 80 is configured such that when the mop cloth 90 is mounted, the mop cloth 90 comes into contact with the floor surface. Considering the thickness of the mop cloth 90, the rotary mop 80 is configured to change a separation distance between a casing and the first and second rotating plates 81 and 82 according to the thickness of the mop cloth 90.

The rotary mop 80 adjusts the separation distance between the casing and the rotating plate 81, 82 so that the mop cloth 90 comes in contact with the floor surface, and the rotating plate 81, 82 includes a mop fixing part (not shown) for fixing the mop cloth 90. The mop fixing part may fix the mop cloth 90 in a detachable manner. The mop fixing part may be a velcro or the like disposed below the rotating plate 81, 82. The mop fixing part may be a hook or the like disposed in the edge of the rotating plate 81, 82.

Figure 4:
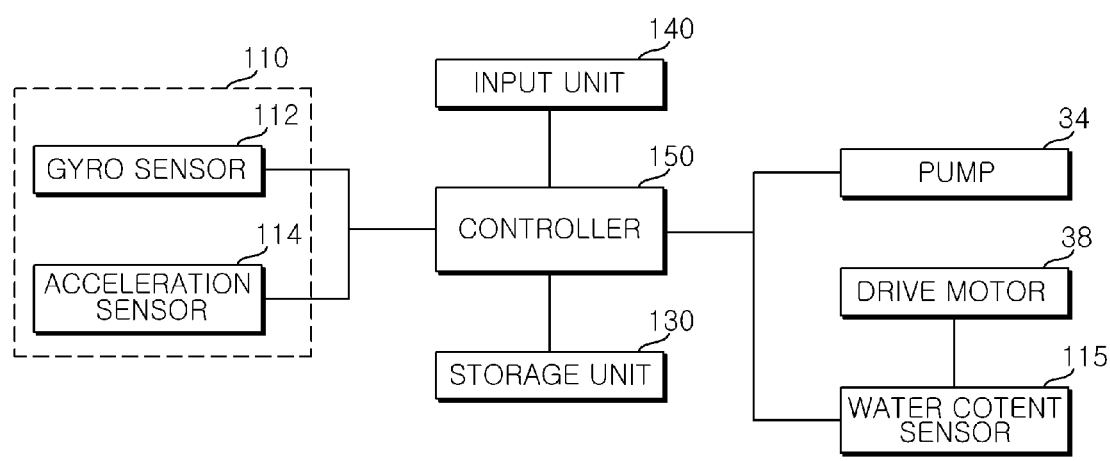
FIG. 4 is a block diagram illustrating a controller of a robot cleaner and a configuration related to the controller according to an embodiment of the present disclosure.

FIG. 4 is a block diagram illustrating a controller of a robot cleaner and a configuration related to the controller according to an embodiment of the present disclosure.

The robot cleaner 100 according to the present embodiment further includes a motion detection unit 110 that detects the motion of the robot cleaner 100 according to a reference motion of the main body 10 when the spin mop rotates. The motion detection unit 110 may further include a gyro sensor 112 that detects the rotational speed of the robot cleaner 100 or an acceleration sensor 114 that detects an acceleration value of the robot cleaner 100. In addition, the motion detection unit 110 may use an encoder (not shown) that detects the moving distance of the robot cleaner 100.

The robot cleaner 100 according to the present embodiment provides power to the drive motor 38 that rotates the rotary mop 80, and reads the output current of the drive motor 38 to transmit to a controller 150.

The controller 150 transmits a current for rotating the drive motor 38, reads the output current of the drive motor 38 according to a set cycle, and transmits the output current to the controller 150.

The controller 150 receives the output current from a motor controller 160 and analyzes the output current to determine the current water content of the spin mop.

At this time, the controller 150 may acquire a plurality of image information according to a plurality of light sources by using a camera sensor having separate light sources and image sensors, and compare the acquired image information to determine the state of the floor. However, it is not limited thereto.

The robot cleaner 100 may further include a cliff sensor that detects the existence of a cliff on the floor in the cleaning area. The cliff sensor according to the present embodiment may be disposed in the front portion of the robot cleaner 100. In addition, the cliff sensor according to the present embodiment may be disposed in one side of a bumper.

When the controller 150 includes the cliff sensor, the material of the floor can be determined based on the amount of the light that is output from the light emitting device and reflected from the floor and then received by the light receiving device, but is not limited thereto.

The controller 150 determines the water content of the rotary mop 80 and a certain floor state according to the value of the output current of the drive motor 38.

The water content refers to the degree to which the rotary mop 80 contains water, and a state in which the water content is '0' means a state in which water is not contained in the rotary mop 80 at all. The water content according to the present embodiment may be set to a ratio of containing water according to the weight of the mop pad. It is also possible that the rotary mop 80 contains water of the same weight as the weight of the mop pad, or contains water in excess of the weight of the mop pad.

Figure 5A:
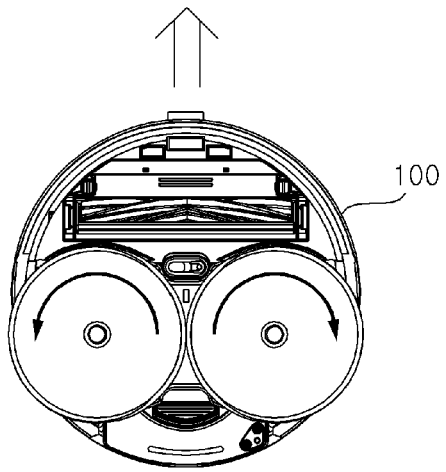
FIGS. 5A to 5C are graphs illustrating a relationship between a water content of robot cleaner and a current according to an embodiment of the present disclosure.

As shown in FIG. 5A, in the rotary mop 80 containing more water, as the water content is increased, the frictional force with the floor surface is increased due to the influence of water.

Figure 5B:
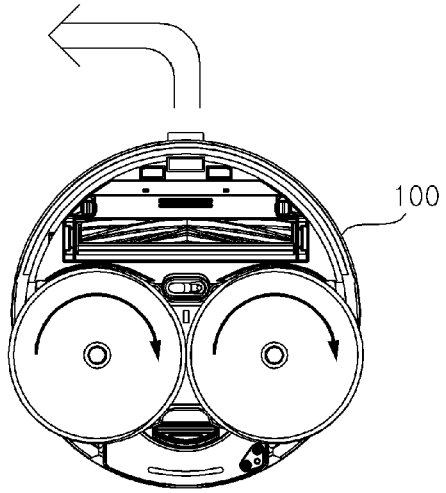
Figure 5C:
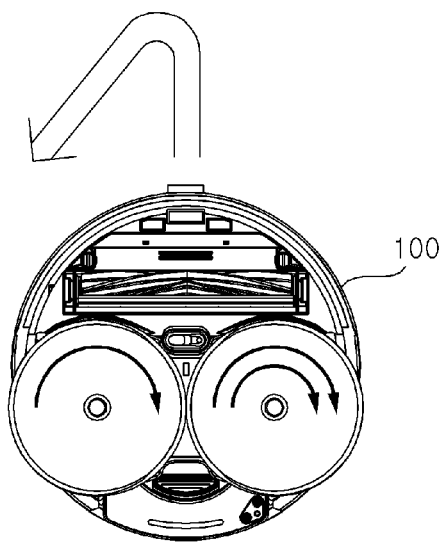

In addition, as shown in FIG. 5B, when the rotation speed of the motor 38 for rotating the rotary mop 80 decreases, it means that the torque of the motor 38 increases, and accordingly, the output current of the drive motor 38 for rotating the rotary mop 80 increases.

That is, when the water content is increased, a relationship in which the output current of the drive motor 38 for rotating the rotary mop 80 is increased due to the increasing frictional force is established.

Accordingly, as the output current of the drive motor 38 is measured, it is possible to determine the current state of the water content of the rotary mop 80.

The relationship between the output current of the drive motor 38 and the water content can be experimentally determined, and can be stored as data in a storage unit 130 described below.

The controller 150 reads data stored in the storage unit 130, for example, corresponding data according to the relationship between the water content and the output current, which are arranged in a lookup table, and determines a specific water content.

For example, the controller 150 stores a threshold value for a corresponding output current value as data with respect to the output current value of the drive motor 38 and the water content, and compares the obtained output current value with the data of threshold value to determine whether the output current value in the current cycle is greater than the threshold value.

The threshold value may be defined as a minimum value of water content that can initiate wet cleaning.

The controller 150 may control the operation of the robot cleaner 100 by initially analyzing the value of the output current of the drive motor 38 according to a certain cycle.

The robot cleaner 100 according to the present embodiment may control to start cleaning in a state in which sufficient water content is satisfied by reading the output current value of the drive motor 38 by adding only simple logic.

Each data value for the output current value can be set experimentally, and can be updated by learning through artificial intelligence.

Meanwhile, the robot cleaner 100 of the present disclosure may include at least one water content sensor 115, installed on the floor surface, for measuring the water content of the mop cloth 90.

The water content sensor 115 is disposed in a surplus area between two rotating plates 81 and 82, which are objects for measuring water content, as shown in FIGS. 2 and 3, and senses the water content of the mop cloth 90 to output a detection signal to the controller 150.

At this time, the water content sensor 115 may be formed to be close to the water tank, but may be formed to be close to the image sensor.

The water content sensor 115 may be a humidity sensor, or, alternatively, may be a conductivity sensor.

As described above, in the case of the conductivity sensor, the transferred electric conductivity is variable according to the water content of both mop cloths 90, and the value of the output current is determined. Therefore, it is possible to determine the water content currently contained in the mop cloth 90 by reading the output detection signal.

The robot cleaner 100 according to the present embodiment may further include an input unit 140 for inputting a user's command. The user may set a driving method of the robot cleaner 100, a threshold value of the water content of the spin mop, or the like through the input unit 140.

In addition, the robot cleaner 100 may further include a communication unit, and may provide an alarm or information according to a determination result of the controller 150 to a server or a user terminal through the communication unit.

FIG. 6 is a diagram for explaining the motion of the robot cleaner 100 according to an embodiment of the present disclosure, and the traveling of the robot cleaner 100 and the movement of the robot cleaner 100 according to the rotation of the rotary mop will be explained with reference to FIG. 6.

The robot cleaner 100 according to the present embodiment includes a pair of rotary mops, and moves by rotating the pair of rotary mops. The robot cleaner 100 may control the traveling of the robot cleaner 100 by varying the rotation direction or the rotation speed of each of the pair of rotary mops.

Figure 6A:
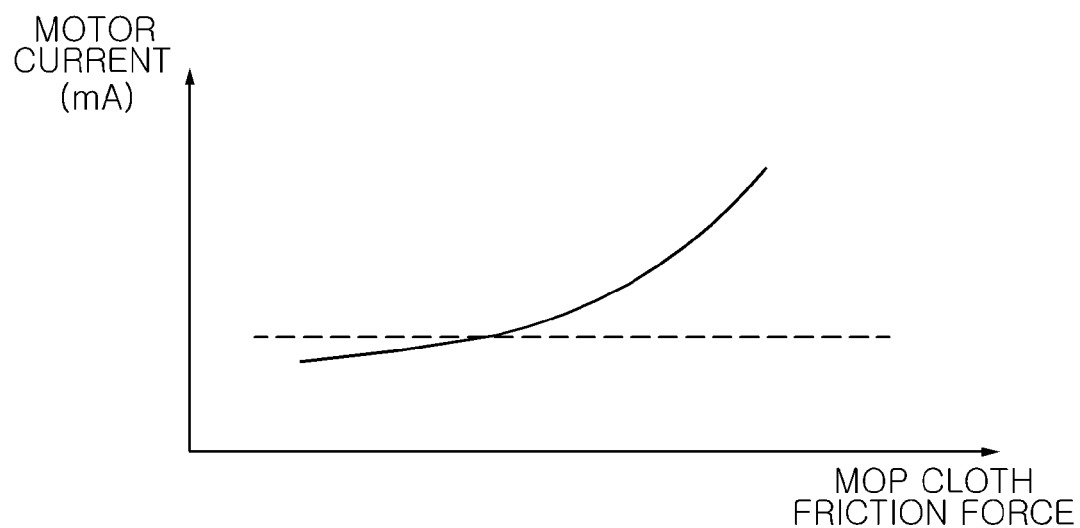
FIGS. 6A to 6B are views for explaining the rotation of a spin mob when a robot cleaner moves according to an embodiment of the present disclosure.

Referring to FIG. 6A, the robot cleaner 100 may move in a straight line by rotating the pair of rotary mops in opposite directions. In this case, the rotation speed of each of the pair of rotary mops is the same, but the rotation direction is different. The robot cleaner 100 may move forward or backward by changing the rotation direction of both rotary mops.

Figure 6B:
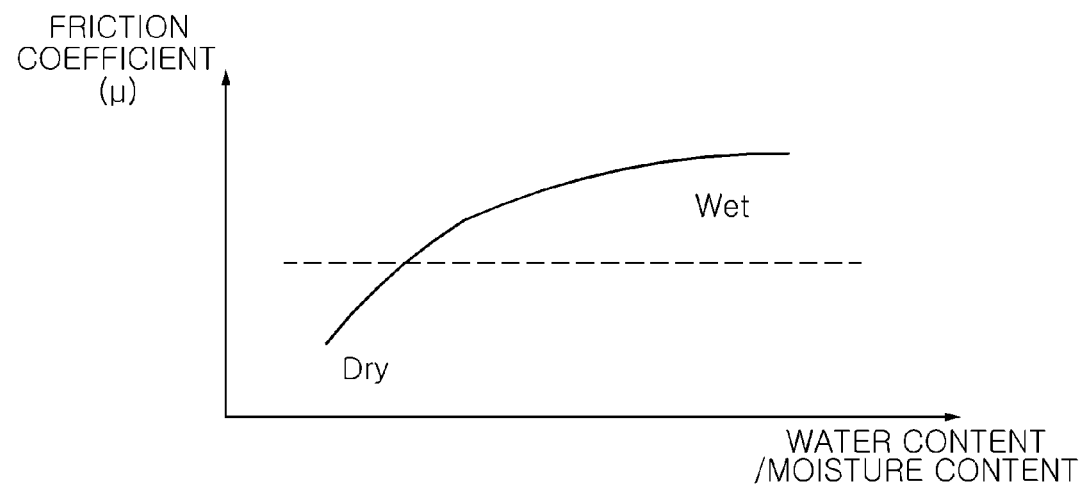

In addition, referring to FIGS. 6b and 6c, the robot cleaner 100 may rotate by rotating each of the pair of rotary mops in the same direction. The robot cleaner 100 may rotate in place by varying the rotation speed of each of the pair of rotary mops, or perform a round rotation that moves in a curve. The radius of the round rotation can be adjusted by varying the rotation speed ratio of each of the pair of rotary mops of the robot cleaner 100.

Hereinafter, a method of controlling the water content of the robot cleaner 100 according to the present embodiment will be described with reference to FIGS. 7 and 8.

Figure 7:
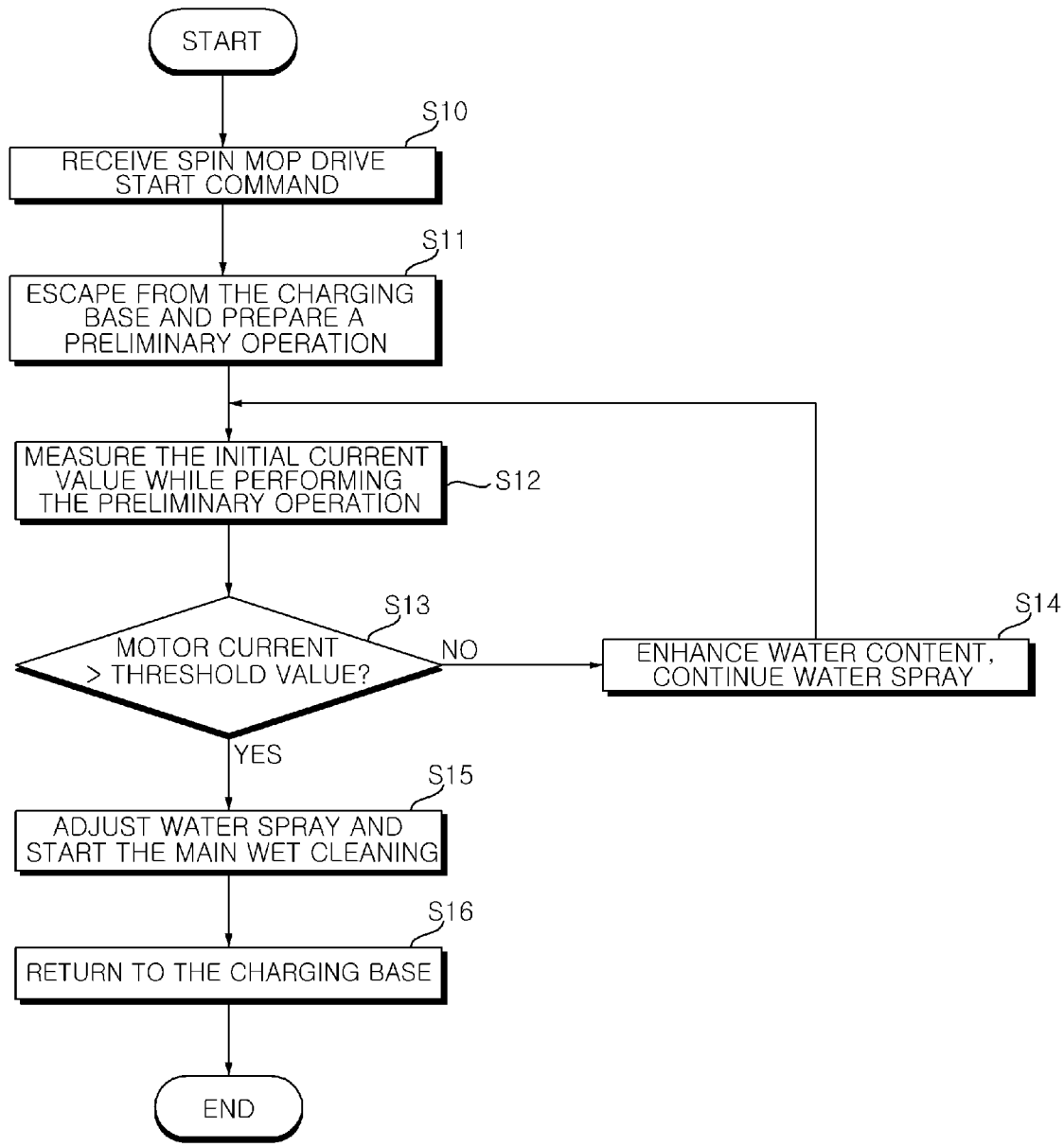
FIG. 7 is a flowchart illustrating a control method of a robot cleaner according to an embodiment of the present disclosure.

FIG. 7 is a flowchart illustrating a control method of a robot cleaner according to an embodiment of the present disclosure.

The robot cleaner 100 according to the present embodiment may receive a cleaning start command from a server or an application of a user terminal. In addition, the robot cleaner 100 may receive a cleaning start command directly from the user through the input unit (S10).

Before starting cleaning according to the received cleaning start command, the controller 150 of the robot cleaner 100 escapes from the charging base 200 as a preliminary operation in a preliminary step and rotates the drive motor 38 to move (S11).

At this time, the preliminary operation may be a preset operation, and be a forward operation that moves to escape the charging base 200 such that the drive motor 38 is rotated to rotate the rotary mop 80 in a certain direction.

At this time, the controller 150 may read the initial value of the output current from the drive motor 38 and set an initial value (S12).

Before performing the wet cleaning, the controller 150 determines whether the current value of the drive motor 38 is greater than the threshold value, based on the output current value of the drive motor 38 obtained while performing the preliminary operation around the charging base 200 for a certain time (S13).

The threshold value may be defined as a minimum value that can be determined to be sufficient for the water content of the mop cloth 90 of the rotary mop 80 to proceed with a main wet cleaning, and when the initial output current value of the drive motor 38 is greater than the threshold value, it is determined to be sufficient to proceed with the main wet cleaning, so that the main wet cleaning is started (S15).

That is, the nozzle and the pump 34 are driven and the main wet cleaning is performed by rotating the rotary mop 80 while adjusting the water spray amount to maintain the water content of a certain value.

Meanwhile, when the motor current value obtained in the preliminary operation is smaller than the threshold value, the nozzle and the pump 34 are controlled to meet a certain water content, so that water spray is continued (S14). At this time, water spray may proceed in the state in which the robot cleaner 100 is stopped, that is, the driving of the drive motor 38 is stopped, but unlike this, water spray may proceed while implementing a motion such as a forward movement within a certain section or a rotation in place.

When a motion such as a forward movement within a certain section or an in-place rotation is performed, the rotary mop 80 is rotated due to the driving of the drive motor 38, and water can be uniformly spread throughout the mop cloth 90, so that the time for reaching a desired water content level can be effectively reduced.

Therefore, when the water content is improved to a certain level, the current value is read and compared with a threshold value, and when the current value is greater than the threshold value, the main cleaning start step is repeated.

When the main cleaning starts, the robot cleaner 100 moves and cleans while rotating the rotary mop 80. The rotary mop 80 also performs wet cleaning in a state of containing certain water content according to water spray from the nozzle driven by the pump 34.

At this time, the controller 150 may proceed with cleaning intensity and traveling by controlling the rotational direction and rotational speed of the rotary mop 80, and perform cleaning while traveling in a certain mode according to the cleaning area.

As described above, when the cleaning start command is received, the controller 150 determines the water content by driving the drive motor 38 in a preliminary operation before the main cleaning step, so that the wet cleaning is performed only when the mop cloth 90 has more than a certain water content.

Therefore, it is possible to prevent the decrease of efficiency due to the performing of wet cleaning in a state in which the mop cloth 90 does not retain sufficient moisture.

When the cleaning is terminated, the controller 150 may control to return to the charging base 200 (S16).

The robot system according to the present embodiment may have a configuration as shown in FIG. 1, and when the robot cleaner 100 performing the operation as shown in FIG. 7 exists in the robot system, it may provide an alarm for water shortage to a user by using an output current value of the drive motor 38 in association with the server 2 and the user terminal 3.

Hereinafter, a control method of the robot cleaner will be described with reference to FIG. 8.

Figure 8:
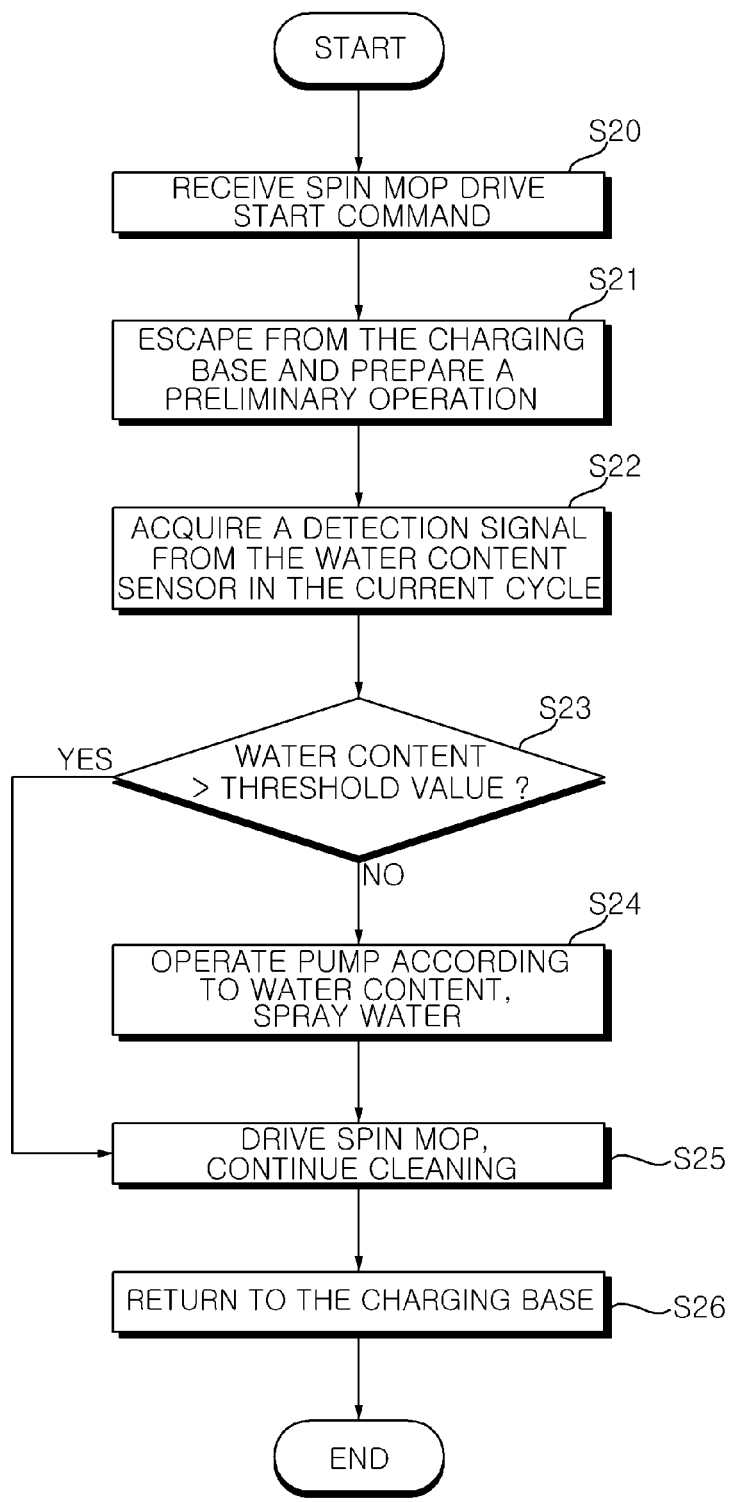
FIG. 8 is a flowchart illustrating a control method of a robot cleaner according to another embodiment of the present disclosure.

Referring to FIG. 8, the robot cleaner 100 according to another embodiment of the present disclosure may receive a cleaning start command from an application of a server or a user terminal. In addition, the robot cleaner 100 may receive a cleaning start command directly from a user through the input unit (S20).

Before starting cleaning according to the received cleaning start command, the controller 150 of the robot cleaner 100 escapes from the charging base 200 as a preliminary operation and rotates the drive motor 38 to move (S11). At this time, as a preliminary operation, the robot cleaner 100 may move to be located within a certain distance from the charging base 200.

At this time, the controller 150 may read a detection signal for the initial water content from the water content sensor 115 to set an initial value (S22).

Before performing the wet cleaning, the controller 150 determines whether the water content from the detection signal for the initial water content from the water content sensor 115 is greater than the threshold value, based on the detection signal for the initial water content from the water content sensor 115 obtained while performing the preliminary operation for a certain time around the charging base 200 (S33).

The threshold value may be defined as a minimum value that can be determined to be sufficient for the water content of the mop cloth 90 of the rotary mop 80 to proceed with a main wet cleaning, and when the water content of the detection signal from the water content sensor 115 is greater than the threshold value, it is determined to be sufficient to proceed with the main wet cleaning, so that the main wet cleaning is started (S25).

That is, the nozzle and the pump 34 are driven and the main wet cleaning is performed by rotating the rotary mop 80 while adjusting the water spray amount to maintain the water content of a certain value.

Meanwhile, when the initial water content from the water content sensor 115 obtained in the preliminary operation is smaller than the threshold value, the nozzle and the pump 34 are controlled to satisfy certain water content at the current position while stopping the driving of the drive motor 38, so that water spray is continued (S24).

Therefore, when the water content is improved to a certain level, the detection signal is read again from the water content sensor 115 and compared with a threshold value, and when the detection signal is greater than the threshold value, the main cleaning start step is repeated.

When the main cleaning starts, the robot cleaner 100 moves and cleans while rotating the rotary mop 80. The rotary mop 80 also performs wet cleaning in a state of containing certain water content according to water spray from the nozzle driven by the pump 34.

At this time, the controller 150 may proceed with cleaning intensity and traveling by controlling the rotational direction and rotational speed of the rotary mop 80, and perform cleaning while traveling in a certain mode according to the cleaning area.

As described above, when the cleaning start command is received, the controller 150 determines the water content from the water content sensor 115 as a preliminary operation before the main cleaning step, so that the wet cleaning is performed only when the mop cloth 90 has more than a certain water content.

Therefore, it is possible to prevent the decrease of efficiency due to the performing of wet cleaning in a state in which the mop cloth 90 does not retain sufficient moisture.

When the cleaning is terminated, the controller 150 may control to return to the charging base 200 (S16).

Meanwhile, according to an embodiment of the present disclosure, a smart home system including the robot cleaner described above may be implemented.

Hereinafter, a smart home system will be described with reference to FIGS. 9 to 11B.

Figure 9:
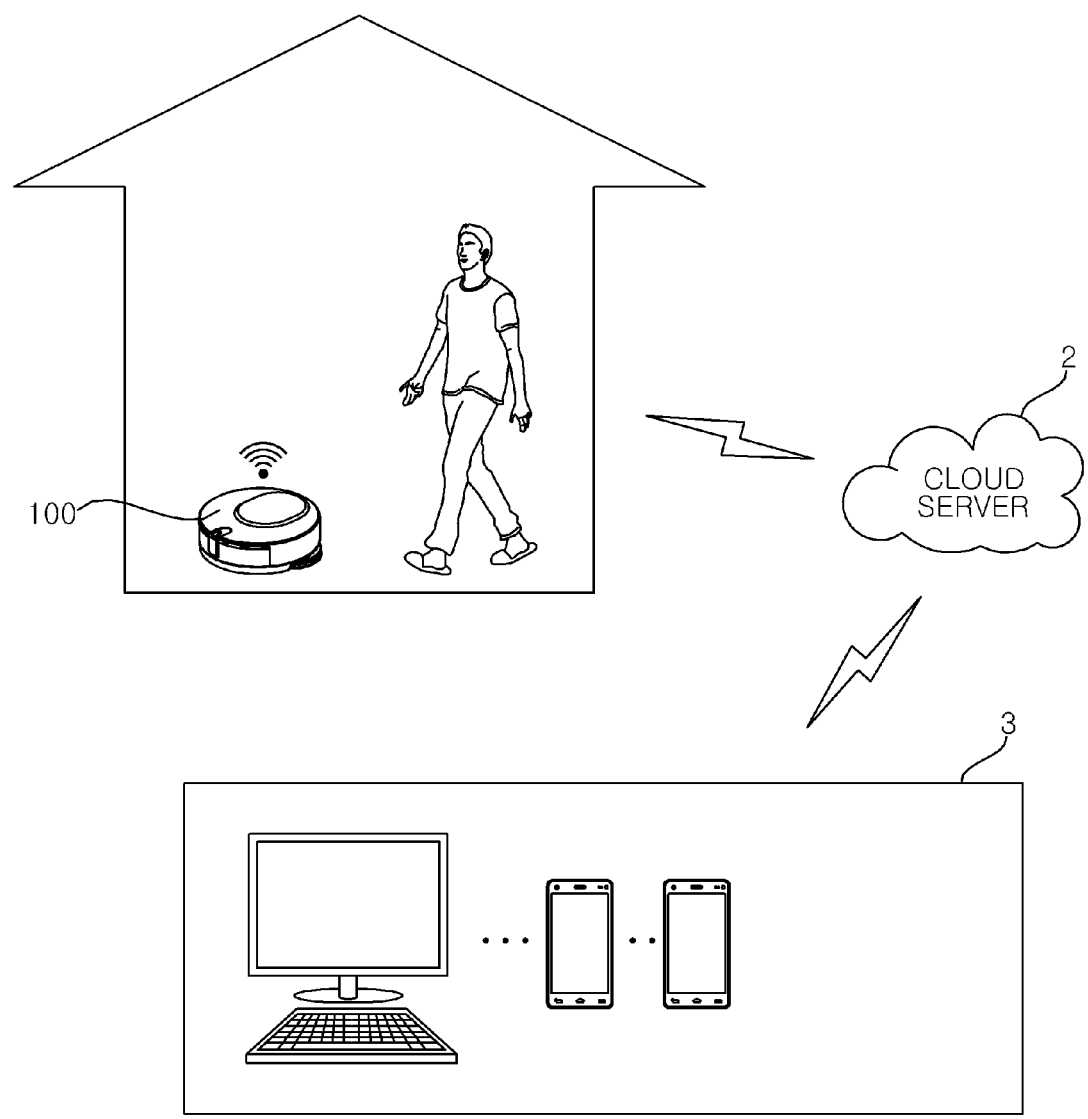
FIG. 9 is a configuration diagram of a smart home system including a robot cleaner according to an embodiment of the present disclosure.
Figure 10:
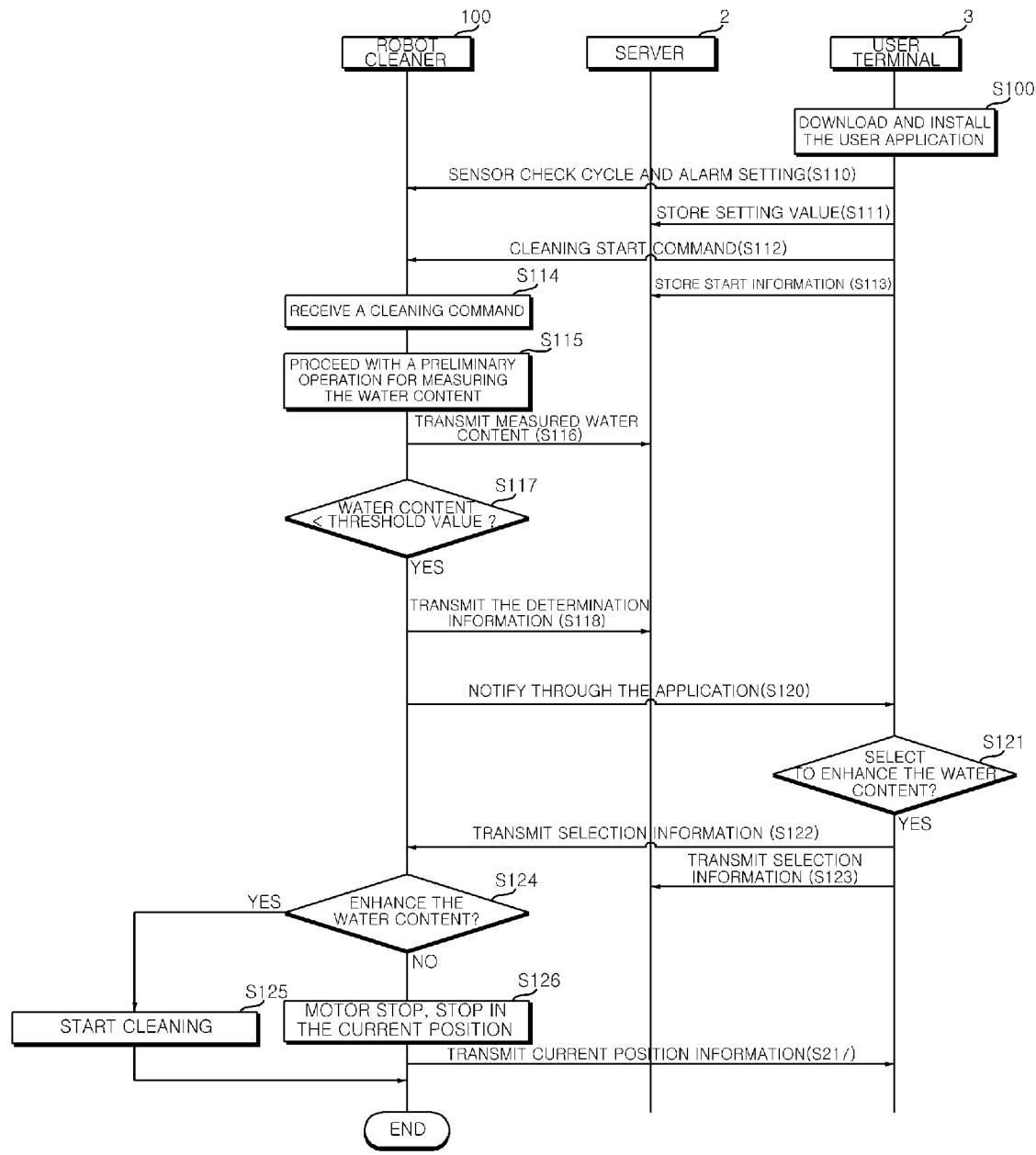
FIG. 10 is a flow chart illustrating the overall operation of a robot cleaner system of the present disclosure of FIG. 9.
Figure 11A:
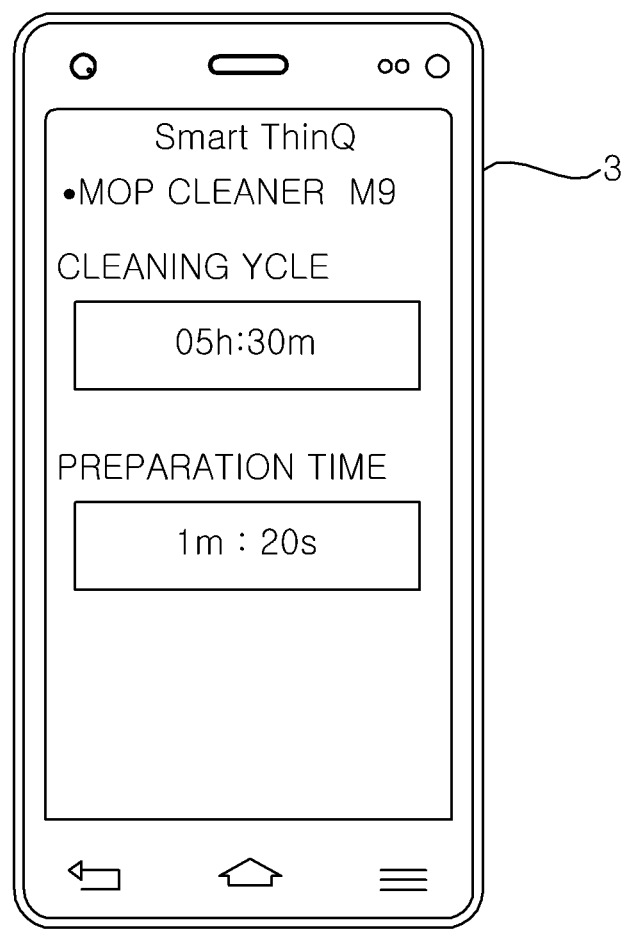
FIGS. 11A and 11B are state diagrams of a user terminal for explaining the flowchart of FIG. 10.
Figure 11B:
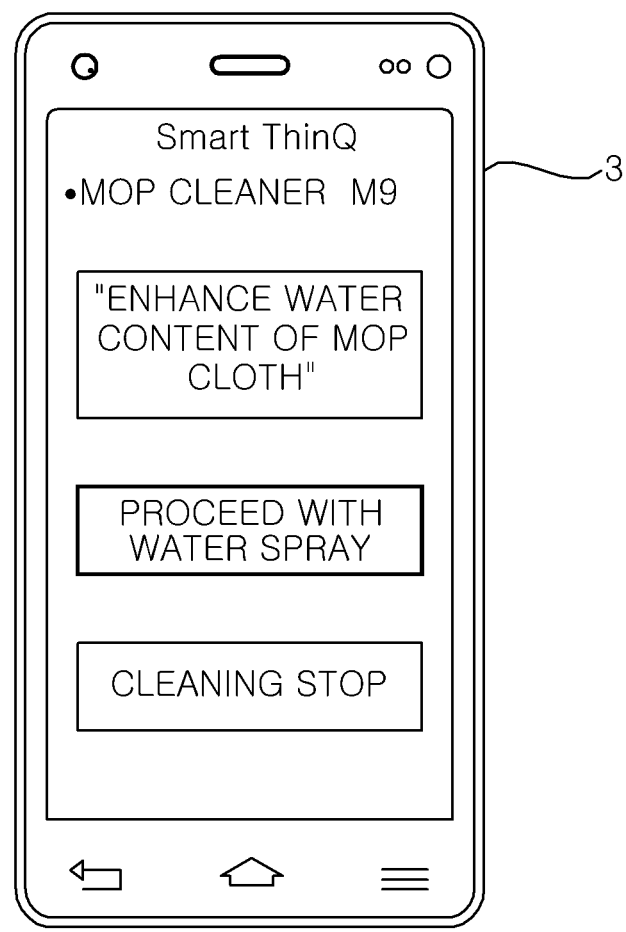

FIG. 9 is a configuration diagram of a smart home system including a robot cleaner according to an embodiment of the present disclosure, FIG. 10 is a flow chart illustrating the overall operation of a robot cleaner system of the present disclosure of FIG. 9, and FIGS. 11A and 11B are state diagrams of a user terminal for explaining the flowchart of FIG. 10.

Referring to FIG. 9, a smart home system according to an embodiment of the present disclosure may include one or more robot cleaners 100 to provide a service in a prescribed place such as a house. For example, the robot system may include a robot cleaner 100 that provides a cleaning service at a designated place in a home or the like. In particular, the robot cleaner 100 may provide a dry, wet or dry/wet cleaning service according to an included function block.

Preferably, the robot system according to an embodiment of the present disclosure may include a plurality of artificial intelligence robot cleaners 100 and a server 2 capable of managing and controlling the plurality of artificial intelligence robot cleaners 100.

The server 2 can remotely monitor and control the states of the plurality of robot cleaners 100, and the robot system can provide a more effective service by using the plurality of robot cleaners 100.

The plurality of robot cleaners 100 and the server 2 may be provided with communication means (not shown) supporting one or more communication standards to communicate with each other. In addition, the plurality of robot cleaners 100 and the server 2 may communicate with a PC, a mobile terminal, and other external server 2.

For example, the plurality of robot cleaners 100 and the server 2 can be implemented to perform a wireless communication by using a wireless communication technology such as IEEE 802.11 WLAN, IEEE 802.15 WPAN, UWB, Wi-Fi, Zigbee, Z-wave, Blue-Tooth, and the like. The robot cleaner 100 may be changed according to the communication method of other device or server 2 desired to communicate with.

In particular, the robot cleaner 100 may perform a wireless communication with other robot 100 and/or the server 2 through a 5G network. When the robot cleaner 100 performs a wireless communication through the 5G network, real-time response and real-time control can be achieved.

A user can check information related to the robots 100 in the robot system through a user terminal such as a PC, or a mobile terminal.

The server 2 may be implemented as a cloud server 2, and the cloud server 2 may be linked to the robot 100 to monitor and control the robot cleaner 100 and remotely provide various solutions and contents.

The server 2 may store and manage information received from the robot cleaner 100 and other devices. The server 2 may be a server 2 provided by a manufacturer of the robot cleaner 100 or a company entrusted by a manufacturer. The server 2 may be a control server 2 for managing and controlling the robot cleaner 100.

The server 2 may collectively control the robot cleaners 100 in the same manner, or may individually control the robot cleaners 100. Meanwhile, the server 2 may be configured by distributing information and functions to a plurality of servers, or may be configured as a single integrated server.

The robot cleaner 100 and the server 2 may be provided with communication means (not shown) supporting one or more communication standards to communicate with each other.

The robot cleaner 100 is a robot cleaner according to an embodiment of the present disclosure described with reference to FIGS. 1 to 4, and may be a smart cleaning robot that mainly performs wet cleaning.

The robot cleaner 100 may transmit data related to space, object, and usage to the server 2.

Here, the data related to space, object, and usage may be a recognition-related data of space and object recognized by the robot cleaner 100, or may be image data for space and object acquired by the image acquisition unit.

According to an embodiment, the robot cleaner 100 and the server 2 may include artificial neural networks (ANN) in the form of software or hardware learned to recognize at least one of attributes of object such as a user, a voice, an attribute of space, and an obstacle.

The server 2 allows the deep neural network (DNN) to learn based on data received from the robot cleaner 100, data input by the user, and the like, and may transmit the updated deep neural network (DNN) structure data to the robot 1. Accordingly, the deep neural network (DNN) structure of artificial intelligence provided by the robot 100 may be updated.

Based on the received data, the server 2 may allow the deep neural network (DNN) to learn, and transmit the updated deep neural network (DNN) structure data to the artificial intelligence robot cleaner 100 to update.

Accordingly, the robot 100 becomes more and more smart, and it is possible to provide a user experience (UX) that evolves as it is used.

Meanwhile, the server 2 may provide information related to the control and the current state of the robot cleaner 100 to the user terminal, and can generate and distribute an application for controlling the robot cleaner 100.

Such an application may be an application for PC applied as the user terminal 3 or an application for smartphone.

For example, it may be an application for controlling a smart home appliance, such as a SmartThinQ application, which is an application that can simultaneously control and manage various electronic products of the present applicant.

Hereinafter, a control method of a smart home system including a robot cleaner performing the operations of FIGS. 1 to 8 will be described with reference to FIG. 10.

Referring to FIG. 10, in the robot system including the robot cleaner 100 according to an embodiment of the present invention, the robot cleaner 100, the server 2, and the user terminal 3 may perform control of the robot cleaner 100 by performing wireless communication with each other.

First, the server 2 of the robot system produces a user application that can control the robot cleaner 100, and holds the application in a state that can be distributed online.

The user terminal 3 downloads and installs the user application online (S100).

The user terminal 3 executes the user application and registers a member and registers the robot cleaner 100 owned by a user in a corresponding application, and links the application with a corresponding robot cleaner 100.

The user terminal 3 may set various functions for a corresponding robot cleaner 100, and specifically, as shown in FIG. 11A, it is possible to set a cleaning cycle, a preparation time for a preliminary operation for checking the water content of the rotary mop 80, and a method of alarming the result of checking the water content of the rotary mop 80 according to the preparation time (S110).

The preparation time may be preferably within 3 minutes, and more preferably 0.5 to 1.5 minutes.

As an alarm method, a sound alarm and a display alarm can be selected, and an alarm cycle can also be set.

Further, in addition to displaying the alarm on the application of the user terminal 3 as an alarm method, a method that the robot cleaner 100 itself provides an alarm to arouse the user's attention may also be selected.

The user terminal 3 transmits data to the server 2 through the application for such a setting information, stores data in the server 2 (S111), and transmits data through the wireless communication for the preparation time for water content detection and alarm setting information also to the robot cleaner 100.

Next, the robot cleaner 100 may receive a cleaning start command from an application of the user terminal 3 (S112). At this time, the start information from the application of the user terminal 3 can be transmitted to the server 2 and stored in the server 2 (S113).

When receiving a cleaning start command (S114), as a preliminary operation prior to the cleaning start, the robot cleaner 100 may perform an operation of measuring the water content of the rotary mop (S115).

At this time, in order to measure the water content, as described above, the output current of the motor may be detected and calculated, or the water content may be calculated through the output value from the water content sensor.

The robot cleaner 100 may transmit information related to the calculated water content to the server 2 through the communication unit (S116), and the server 2 may store the information.

Next, the robot cleaner 100 determines whether a corresponding water content exceeds a threshold value (S117).

At this time, the threshold value may be a minimum water content value for performing wet cleaning as described above.

The robot cleaner 100 may transmit the determination information to the server 2 through the communication unit (S118), and the server 2 may store the information.

In addition, when the water content is equal to or lower than a threshold value according to the determination information, the controller notifies the user terminal 3 that the water content of the corresponding robot cleaner 100 is insufficient through the application (S120).

As shown in FIG. 11B, the user terminal 3 may display an information window for the robot cleaner 100 in the corresponding application, and an insufficient water content may be displayed in the information window.

At this time, the alarm of insufficient water content may be periodically flickered to arouse the user's attention.

The application of the user terminal 3 may induce a command for the next operation of the robot cleaner 100 to the user along with an alarm of insufficient water content.

As an example, as shown in FIG. 11B, a selectable icon for various operations may be activated in the lower end or the surrounding of the alarm of insufficient water content.

Specifically, in the next operation, a water spray progress icon or a cleaning stop icon may be iconized and activated to increase the water content (S212).

The user terminal 3 may select one of the icons and transmit selection information to the robot cleaner 100 (S122).

The robot cleaner 100 analyzes the selection information (S124), and when a water spray start icon for increasing the water content is selected, the operation of the pump of the robot cleaner 100 is started and the water is sprayed from the nozzle, so that the water content of the mop cloth of the rotary mop can be increased.

At this time, the robot cleaner 125 may periodically detect the water content and proceed with the cleaning operation when the water content exceeds the threshold value (S125).

Meanwhile, when a cleaning stop icon of the user terminal 3 is selected, all operation of the drive motor 38 of the robot cleaner 100 stops so that the rotation of the rotary mop 80 of the robot cleaner 100 stops. This stop is achieved in the current position in a state where the operation of the robot cleaner 100 is stopped (S126).

At this time, when selecting the cleaning stop icon according to the setting, it is possible to induce the user to specifically determine the cause of the insufficient water content by transmitting information related to the current position to the user terminal 3 (S217).

As described above, after checking the water content of the rotary mop 80 before the start of the main cleaning, the wet cleaning starts in a state in which a certain level of water content is satisfied. Accordingly, uniform cleaning may be performed for all zones in which cleaning is performed.

Although the exemplary embodiments of the present disclosure have been disclosed for illustrative purposes, those skilled in the art will appreciate that various modifications, additions and substitutions are possible, without departing from the scope and spirit of the invention as disclosed in the accompanying claims. Accordingly, the scope of the present disclosure is not construed as being limited to the described embodiments but is defined by the appended claims as well as equivalents thereto.

[EXPLANATION OF REFERENCE NUMERAL]

| 100: robot cleaner | 10: main body |
|---|---|
| 32: water tank | 34: pump |
| 38: drive motor | 80: rotary mop |
| 150: controller | 115: water content sensor |
| 130: storage unit | 140: input unit |
| 2: server | 3: user terminal |

The invention claimed is:

1. A robot cleaner comprising:
a main body forming an outer shape;
a pair of rotary mops moving the main body while rotating in contact with a surface;
a drive motor rotating the pair of rotary mops;
a pump connected to a water tank and driving a nozzle for spraying water to at least one of the rotary mops; and
a controller for, after receiving a cleaning start signal, reading an output current of the drive motor and determining a water content of at least one of the rotary mops in a preliminary step before wet cleaning, and controlling to start the wet cleaning after driving the pump until the determined water content of the at least one of the rotary mops satisfies a certain level.

2. The robot cleaner of claim 1, wherein water is sprayed until the water content satisfies the certain level while the robot cleaner moves forward or is operated in a certain pattern mode.

3. The robot cleaner of claim 1, wherein the controller reads the output current of the drive motor, and controls the wet cleaning when the output current is greater than a threshold value.

4. The robot cleaner of claim 3, wherein the threshold value corresponds to a minimum value of wet-cleanable water content.

5. The robot cleaner of claim 1, comprising a water content sensor that measures the water content of at least one of the rotary mops, and outputs a detection signal to the controller.

6. The robot cleaner of claim 5, wherein the water content sensor is disposed to be adjacent to at least one of the rotary mops.

7. The robot cleaner of claim 6, wherein the water content sensor is disposed between each of the rotary mops of the pair of rotary mops.

8. The robot cleaner of claim 7, wherein the water content sensor is a humidity sensor or a conductivity sensor.

9. The robot cleaner of claim 5, wherein the controller receives the detection signal from the water content sensor in the preliminary step, and controls to start the wet cleaning, when the water content corresponding to the detection signal is greater than a threshold value.

10. The robot cleaner of claim 1, further comprising a communication unit that transmits detection information related to the water content of at least one of the rotary mops,
wherein, through the communication unit, the detection information related to the water content of at least one of the rotary mops is transmitted to a user terminal and a control command is received from the user terminal.

11. The robot cleaner of claim 10, wherein the robot cleaner transmits to display the detection information for the water content through an application for controlling the robot cleaner installed in the user terminal.

12. The robot cleaner of claim 11, wherein the robot cleaner receives a command to increase the water content or stop cleaning from the user terminal in the preliminary step, and operates according to the command.

13. A method of controlling a robot cleaner comprising a pair of rotary mops for performing wet cleaning of a floor while rotating in contact with the floor, and a drive motor for rotating the pair of rotary mops, the method comprising:
receiving a cleaning start command of the robot cleaner;
reading an output current of the drive motor, determining a water content of at least one of the rotary mops based on the output current and adjusting the water content of at least one of the rotary mops so that the water content of at least one of the rotary mops satisfies a certain level, as a preliminary step; and
performing a wet cleaning by rotating at least one of the rotary mops while spraying water to the rotary mop, when the determined water content of at least one of the rotary mops satisfies the certain level or higher.

14. The method of claim 13, wherein the robot cleaner comprises:
a pump that is connected to a water tank and drives a nozzle that sprays water to at least one of the rotary mops.

15. The method of claim 14, wherein the preliminary step comprises, when the output current is greater than a threshold value, controlling to proceed with the wet cleaning.

16. The method of claim 15, wherein the threshold value corresponds to a minimum value of wet-cleanable water content.

17. The method of claim 15, wherein the preliminary step comprises separating the robot cleaner from a charging base, and reading the output current of the drive motor while moving the robot cleaner in a preset direction.

18. The method of claim 14, wherein the robot cleaner further comprises a water content sensor for measuring the water content of at least one of the rotary mops and outputting a detection signal to a controller of the robot cleaner.

19. The method of claim 18, wherein the water content sensor is disposed between the each of the rotary mops of the pair of rotary mops.

20. The method of claim 18, wherein the preliminary step comprises receiving the detection signal from the water content sensor, and starting the wet cleaning when the water content corresponding to the detection signal is greater than a threshold value.

21. The method of claim 13, wherein the preliminary step comprises performing water spray so that the water content of at least one of the rotary mops satisfies the certain level while the robot cleaner is stopped.

22. The method of claim 13, wherein the preliminary step comprises spraying water until the water content satisfies the certain level while the robot cleaner moves forward or operates in a certain pattern mode.

* * * * *